April 12, 1932.  E. F. ROSS  1,853,578
THREADLESS HOSE COUPLING
Filed Nov. 2, 1928

Inventor
Elton F. Ross
By
Attorney

Patented Apr. 12, 1932

1,853,578

UNITED STATES PATENT OFFICE

ELTON F. ROSS, OF OLYMPIA, WASHINGTON

THREADLESS HOSE COUPLING

Application filed November 2, 1928. Serial No. 316,806.

One of the objects of my invention is to provide an interchangeable threadless hose coupling designed, primarily, for a quick and effective method of coupling and uncoupling hose with a smooth joint which permits of lengthwise pulling or dragging of the hose through grass, brush, timber and the like without the danger of the coupling becoming snagged.

Another object of my invention is to increase the internal area at the juncture of the coupling, decrease metal, and still retain perfect outside cylindrical form with no projections, and maintain a uniform sealing surface all around the joint.

Another object of my invention is to eliminate the necessity of separate male and female joint members.

Another object of my invention is to provide means for quickly breaking the joint without the necessity of striking the coupling, thus eliminating the possibility of battering the coupling to the point of injury; and with these and other objects in view my invention consists of the parts and combination of parts as will be hereinafter pointed out.

My improved coupling comprises two members of identical construction and, therefore, a description of one is all that is necessary in order to practice the invention.

The coupling member 5 is of cylindrical shape and is provided with the reduced extension 6 over which the end of a hose is securely fastened. This member is provided with an oblong waterway 7 to increase internal area at the juncture of the two members. By making the waterway oblong I am enabled to decrease the metal in the member and still retain the outside cylindrical form free from projections, and also provide and maintain an increased uniform sealing surface 8. It will be appreciated that by making the waterway oblong and disposing the sealing surface 8 oblique to the longitudinal axis of the coupling I secure a materially increased surface as compared with a sealing surface at right angles to the longitudinal axis of the member.

Figure 1:
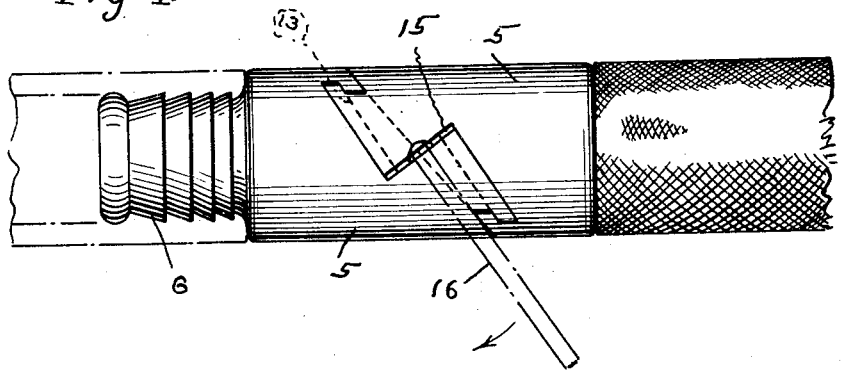
Figure 1 is a side elevation of my improved coupling.
Figure 2:
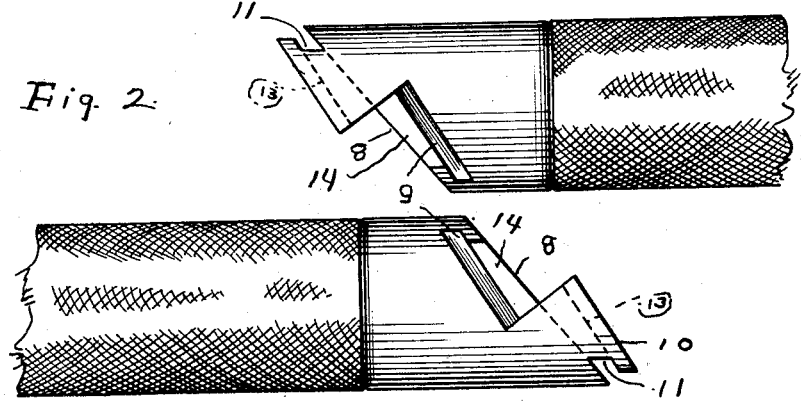
Figure 2 is a view illustrating the two sections of the coupling in position ready to be assembled.
Figure 3:
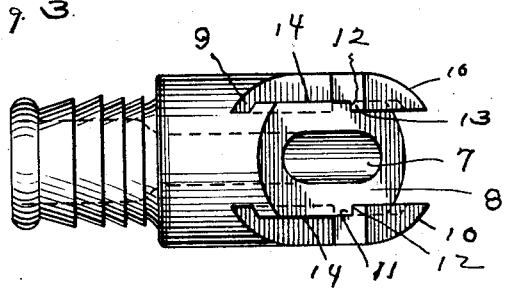
Figure 3 is a top plan view of the coupling member.

In the side walls of the sealing surface 8 I provide a groove 9 disposed at an angle diverging from said surface, said groove opening at one end through the face of the member as clearly shown in Figure 1. At the other end of the groove 8 I provide a locking, or clamping dog 10 (two to each member) which extends outwardly at right angles to the groove and terminates beyond the sealing face 8, and is provided with a groove 11, the upper wall 12 of which overhangs the sealing surface 8 and converges toward the surface 8 from the axis of the member toward its perimeter thereby forming a wedge shaped groove, the rib 13 of the locking dog of one member being adapted to enter the groove 9 of the other member and the side wall 14 of the sealing surface of one member being adapted to slide in the groove 11 in the dog 10 of the other member.

The locking dogs 10 do not abut with each other when the joint is sealed, but are spaced from each other as indicated at 15 into which space an unlocking member 16 may be inserted to move the joint members 5 away from each other whereupon they may easily be separated by hand to uncouple the hose lengths.

What I claim is:

In a hose coupling having two identical interchangeable members having cooperating bearing faces each having a side edge face disposed in spaced relation to the adjacent sides of the member and terminating short of one end of the bearing face, grooves in the said side faces of the member opening at their rear ends through the surface of the body and lying beneath said bearing face mainly in rear of the transverse center thereof and extending forwardly in diverging relation to said face, wedge-shaped tongues being thereby formed between said bearing face and said grooves, locking dogs at the sides of the member between the said side faces and front end of the bearing and extending at right angles thereto above the bearing face and having shoulders at their inner ends, and a groove formed longitudinally in the inner side face of each locking dog, the upper walls of said grooves being arranged to overhang the bearing face and extending rearwardly at a diverging angle to said bearing face reverse to that of the first-named grooves, the length of the dogs being slightly less than the distance between the shoulders and rear end of the bearing face whereby when the members are coupled space will be provided between facing shoulders for insertion of a tool for facilitating separation of the members.

In testimony whereof I affix my signature.

ELTON F. ROSS.